United States Patent [19]

Sano et al.

[11] 3,912,282

[45] Oct. 14, 1975

[54] RECORDING AND REPRODUCING APPARATUS USING FLEXIBLE RECORDING MEDIA

[75] Inventors: Kazuhiko Sano, Toyonaka; Tokiharu Nakagawa, Hirakata; Shoji Omiya, Shijonawate, all of Japan

[73] Assignee: Matsushita Electric Industrial Co., Ltd., Osaka, Japan

[22] Filed: Nov. 2, 1973

[21] Appl. No.: 412,450

[30] Foreign Application Priority Data

| | | |
|---|---|---|
| Nov. 17, 1972 | Japan | 47-115797 |
| June 7, 1973 | Japan | 48-64271 |
| June 20, 1973 | Japan | 48-70027 |
| July 24, 1973 | Japan | 48-83453 |
| June 15, 1973 | Japan | 48-71456 |

[52] U.S. Cl. .......... 274/39 R

[51] Int. Cl.$^2$ .......... G11B 3/60

[58] Field of Search .......... 274/39; 179/100.3 V; 360/102

[56] References Cited

UNITED STATES PATENTS

| | | | |
|---|---|---|---|
| 3,303,485 | 2/1967 | Lee | 360/102 |
| 3,405,405 | 10/1968 | Boissevain et al. | 360/102 |
| 3,603,742 | 9/1971 | Schuller | 360/102 |
| 3,803,351 | 4/1974 | Pedersen et al. | 274/39 R |

*Primary Examiner*—Richard E. Aegerter
*Assistant Examiner*—John W. Shepperd
*Attorney, Agent, or Firm*—Stevens, Davis, Miller & Mosher

[57] ABSTRACT

A device for rotating a flexible recording medium made of plastic or metal sheet at a high speed upon a stabilizing plate with the recording medium being supported by the air flow produced between the recording medium and the stabilizing plate, in which the stabilizing plate is improved to lift the recording medium in flattened state.

11 Claims, 16 Drawing Figures

RECORDING AND REPRODUCING APPARATUS USING FLEXIBLE RECORDING MEDIA

The present invention relates to a flexible disk recording and reproducing apparatus and more particularly to a stabilizing plate for use with such a recording and reproducing apparatus.

In a recording and reproducing apparatus of the type using a flexible disk or disk-shaped flexible recording medium which rotates at a high speed, it has been known the dispose a stabilizing plate in a closely opposed relation with the flexible disk in order to improve the mechanical stability of the flexible disk during its rotation. The stabilizing plate cooperates with the flexible disk rotating at a high speed to produce the flow of air between the flexible disk and the stabilizing plate so as to provide an air cushion upon which is supported the flexible disk.

Further in order to achieve accurate and stable recording and reproducing, there has been proposed a stabilizing plate whose upper surface is curved to have an upwardly convex cross section. When the flexible disk rotates upon such stabilizing plate, it is curved in conformity with the curved surface of the stabilizing plate so that the flexible disk may be always maintained straight at its portion along the ridge of the curved surface of the stabilizing plate. Due to formation of such straight portion, the flexible disk may be stiffened and rotate without considerable vibration so that when a transducer is moved along the ridge of the curved surface of the stabilizing plate, accurate and stable recording or reproducing may be ensured.

However, this prior stabilizing plate has been found to have such a drawback that the straightness of the portion of the flexible disk along the ridge of the curved surface is not satisfactory even though the vibration may be considerably reduced as compared with a stabilizing plate having a flat surface. According to the results of experiments conducted by the inventors, the disk is lifted from the surface of the stabilizing plate by about 50 $\mu$ on an average at the center portion thereof whereas at the peripheral portion it is suddenly lifted to 200 $\mu$. This phenomenon is supposed to be caused by the attractive force attracting the flexible disk toward the stabilizing plate which is produced by the air flow between the flexible disk and the stabilizing plate being overcome by the centrifugal force generating in the rotating disk at its peripheral portion.

In view of the above, one of the objects of the present invention is to provide a stabilizing plate having such a configuration that the profile of the flexible disk along the ridge of the curved surface of the stabilizing plate may be maintained straight without the peripheral edge portion being deformed upwardly.

According to the present invention, in a recording and reproducing apparatus of the type using a disk-shaped flexible recording medium which is supported upon a stabilizing plate through an air cushion produced by the flow of air between the recording medium and the stabilizing plate during its rotation at a high speed, said stabilizing plate has an upper surface curved in the cross section thereof such that the center portion thereof is upwardly convex whereas the edge portions thereof opposed to the peripheral portion of the recording medium are downwardly concave.

For a better understanding of the invention, as well as other objects and advantages thereof, reference is made to the following description to be read in conjunction with the accompanying drawings.

Figure 7:
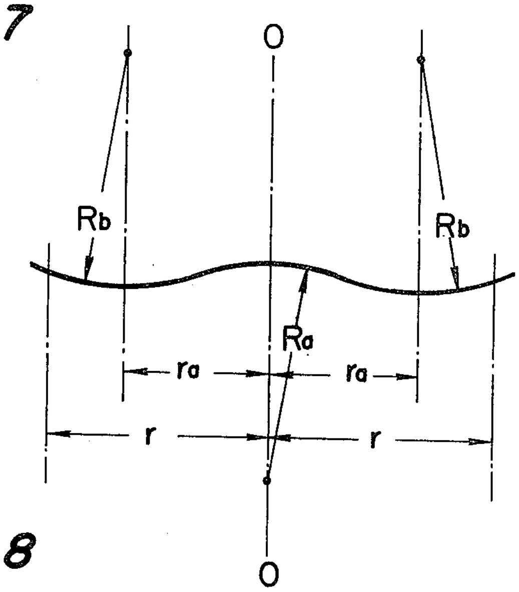
FIG. 7 is an explanatory view showing the configuration of the upper surface of a stabilizing plate according to the present invention.
Figure 10A:
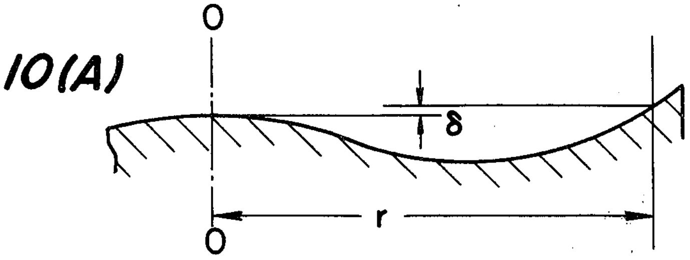
Figure 10B:
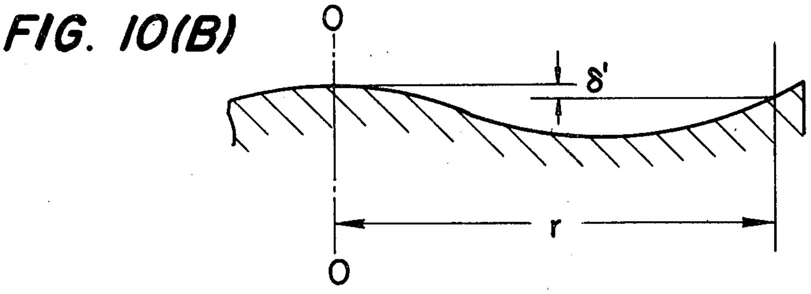
Figures 11, 12, 14A, 14B:
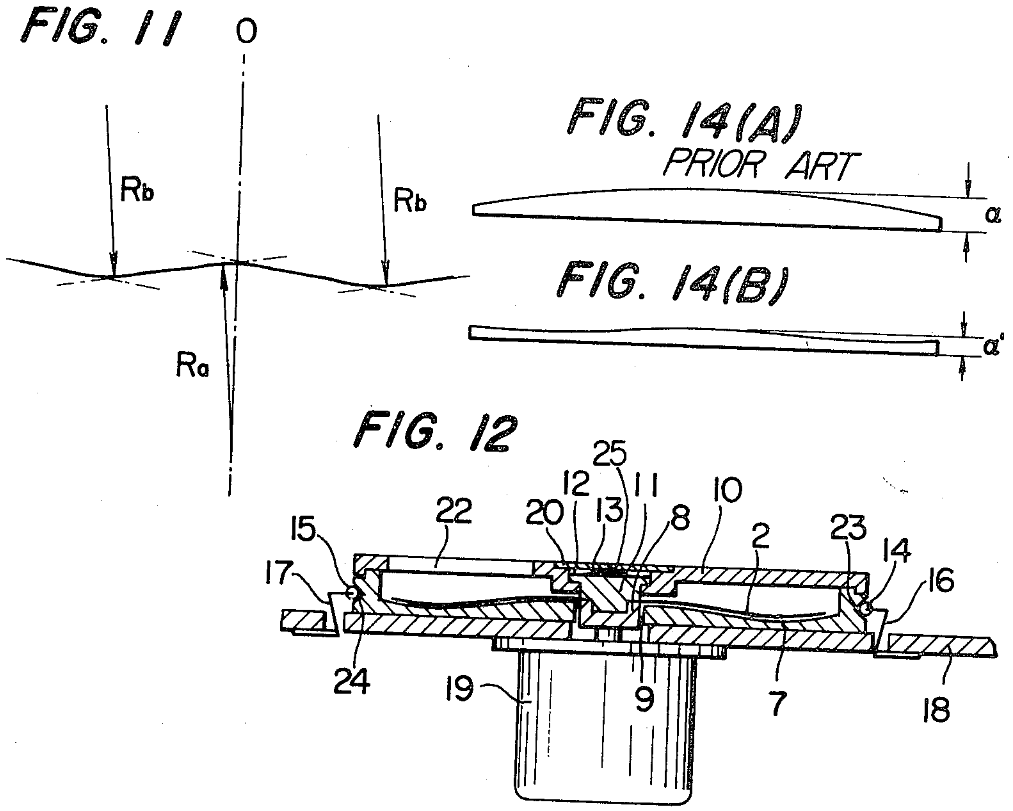
Figure 13:
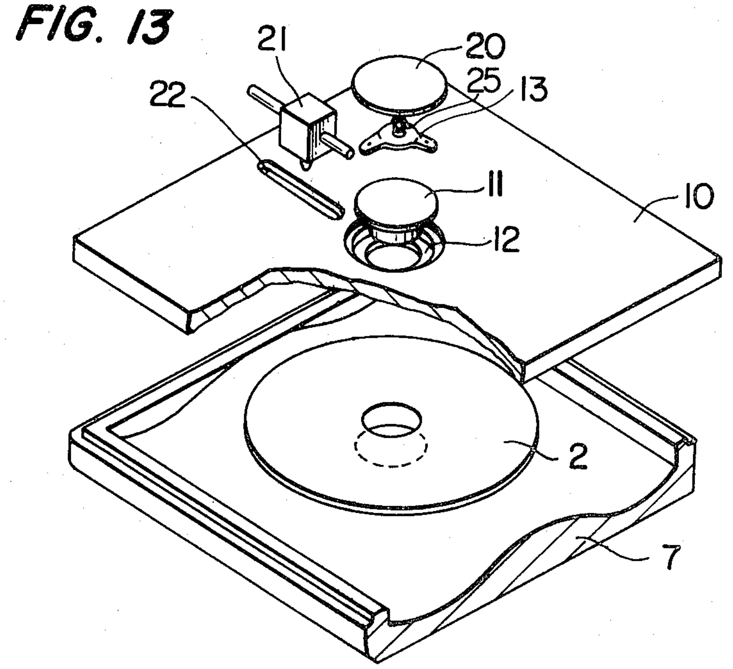

FIGS. 10(A) and 10(B) shows the cross section of the stabilizing plate according to the present invention for explanation of the further detailed configuration thereof;

FIG. 11 is an explanatory view of a configuration of the upper surface of a stabilizing plate according to the present invention slightly modified from the configuration of FIG. 7;

FIG. 12 is a cross sectional view of another embodiment of the present invention showing the stabilizing plate provided in a cartridge of a flexible disk;

FIG. 13 is an exploded perspective view of the embodiment of FIG. 12;

FIGS. 14(A) and 14(B) show schematic cross sections of stabilizing plates according to a prior art and the present invention.

Preceding the description of the preferred embodiments, the prior art will be described with reference to FIGS. 1 to 3 for a better understanding of the present invention.

Figures 1, 2, 3, 4, 5, 6:
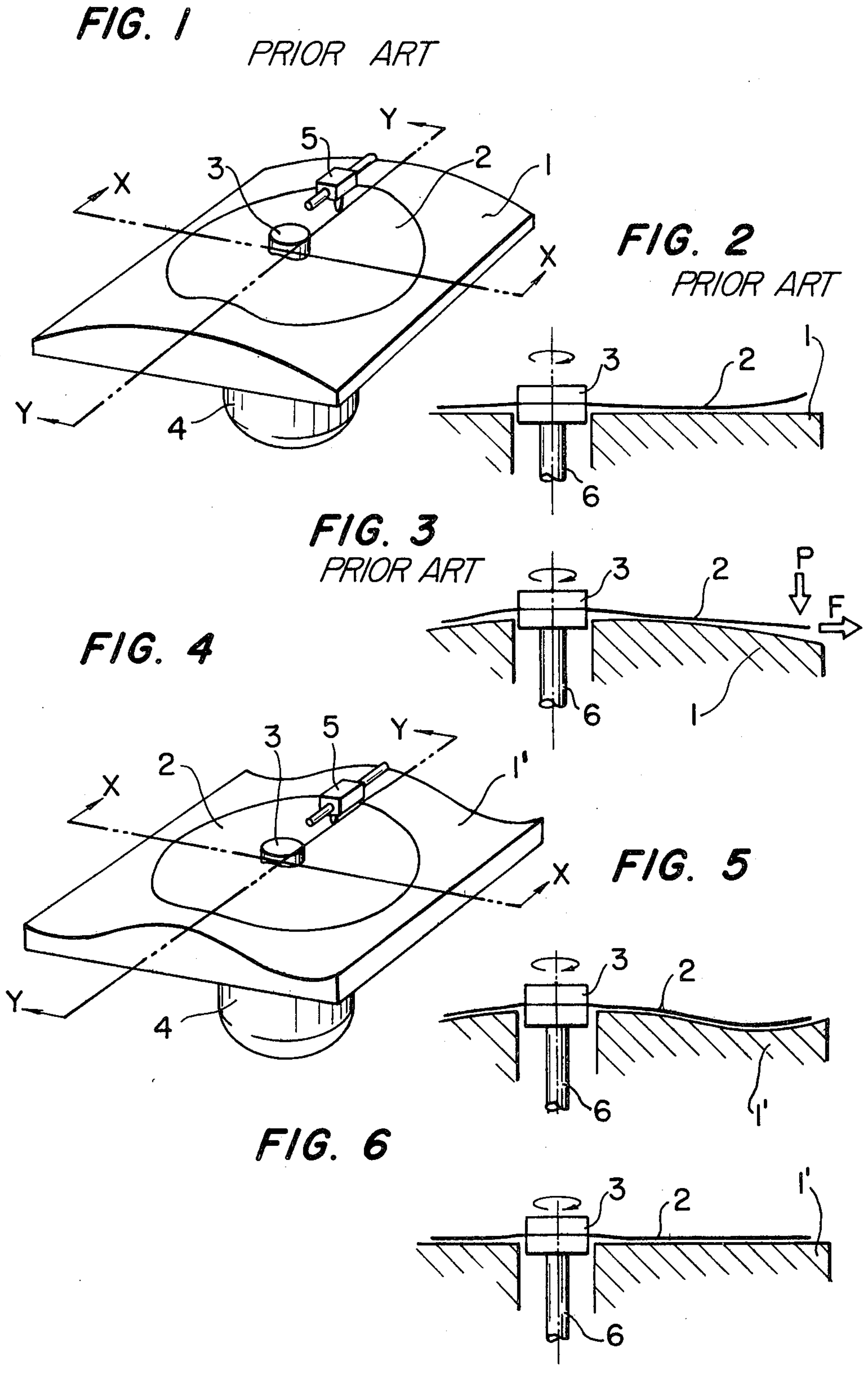
FIG. 1 PRIOR ART, FIG. 2 PRIOR ART, FIG. 3 PRIOR ART, FIG. 4, FIG. 5, FIG. 6
FIG. 1 is a perspective view of a prior stabilizing plate of a recording and reproducing apparatus.
FIG. 2 shows the cross section taken along the line Y — Y of FIG. 1.
FIG. 3 shows the cross section taken along the line X — X of FIG. 1.
FIG. 4 is a perspective view of a stabilizing plate according to the present invention.
FIG. 5 shows the cross section taken along the line X — X of FIG. 4.
FIG. 6 shows the cross section taken along the line Y — Y of FIG. 4.

As shown in FIG. 1 there has been proposed a stabilizing disk whose upper surface is upwardly curved or convexed. Since the flexible disk rotates in conformity with the convex surface of the stabilizing plate, the portion of the flexible disk along the ridge of the convex surface is stiffened, that is the flexible disk is maintained straight along the edge. Furthermore the provision of the stabilizing plate minimizes the vibration of the flexible disk. Therefore, correct and stable recording or reproducing can be assured when a transducer or pickup is moved along the ridge of the convex surface of the stabilizing plate. If the portion of the flexible disk passing below the path of the transducer deforms itself, the gap between the transducer and the flexible disk cannot be maintained constant so that recording or reproducing with a desired degree of accuracy becomes impossible.

In FIG. 1, reference numeral 1 designates a stabilizing plate with a convex surface; 2, a flexible disk; 3, a clamp for clamping the flexible disk 2 upon a spindle (see FIG. 2); 4, a motor; and 5, a transducer adapted to move along the ridge of the convex surface of the stabilizing plate, that is the along the line Y — Y in FIG. 1, to scan the flexible disk.

The inventors made extensive experiments with the stabilizing plates with various types of convex surfaces, and found out that the linearity of the flexible disk along the ridge of the convex surface is not satisfactory even though the vibration may be considerably reduced as compared with a stabilizing plate having a flat surface.

FIG. 2 shows the cross section taken along the line Y — Y of FIG. 1 illustrating the disk along the ridge of the convex surface of the stabilizing plate. The portion of the flexible disk near the peripheral edge is deformed upwardly. According to the results of the experiments conducted by the inventors, the average lift of the disk close to the center thereof is about 50 $\mu$ whereas at the peripheral edge portion the lift is suddenly increased to 200 $\mu$.

Next referring to FIG. 3 which shows the cross section taken along the line X — X of FIG. 1, the reason why the edge portion of the flexible disk is deformed upwardly will be described. Since the pressure of the flow of air between the flexible disk and the stabilizing plate is decreased, the flexible disk is attracted toward the stabilizing plate under the attractive force P. In this case the centrifugal force F is also exerted on the flexible disk. As a result the flexible disk is curved along the line where the attractive force P and the centrifugal force F are in equilibrium. The lift of the portion of the flexible disk close to the center thereof is substantially uniform; but the lift at the edge portion is suddenly increased. The air between the flexible disk and the stabilizing plate is caused to rotate over the stabilizing plate due to the viscous resistance produced by the rotation of the flexible disk, so that the air sucked from the center and the peripheral edge is discharged from the peripheral edge like a swirl under the influence of the centrifugal force. When the lift of the peripheral edge portion of the flexible disk is great, a large quantity of air revolves along the peripheral edge of the flexible disk so that the edge portion of the disk is deformed upwardly as show in FIG. 2.

FIG. 4 shows a stabilizing plate in accordance with the present invention. Reference numeral 1′ designates a stabilizing plate in accordance with the present invention and the other reference numerals designate component parts similar to those shown in FIG. 1. The profile curve of the stabilizing plate 1′ is upwardly curved or convex at the portion close to the center thereof but downwardly curved to concave at the portions which are in opposed relation with the edge portion of the flexible disk. The profile curve may be circular, parabolic or hyperbolic. FIG. 5 shows the cross section taken along the line X — X of FIG. 4. Opposed to the stabilizing plate shown in FIG. 3, the edges of the curved surface of the stabilizing plate 1′ are raised upwardly so as to get near the peripheral edge portion of the flexible disk which has a greater lift so that the uniform lift may be produced. Therefore the quantity of air revolving along the peripheral edge portion of the flexible disk may be reduced. As shown in FIG. 6, which is the cross section taken along the line Y — Y of FIG. 4, the profile of the flexible disk is maintained straight. The transducer 5 shown in FIG. 4 is moved over the flexible disk along the portion which is maintained straight or flat, so that correct and stable recording or reproducing becomes possible because the vibration of the flexible disk is minimized and the profile is straight.

Figure 8:
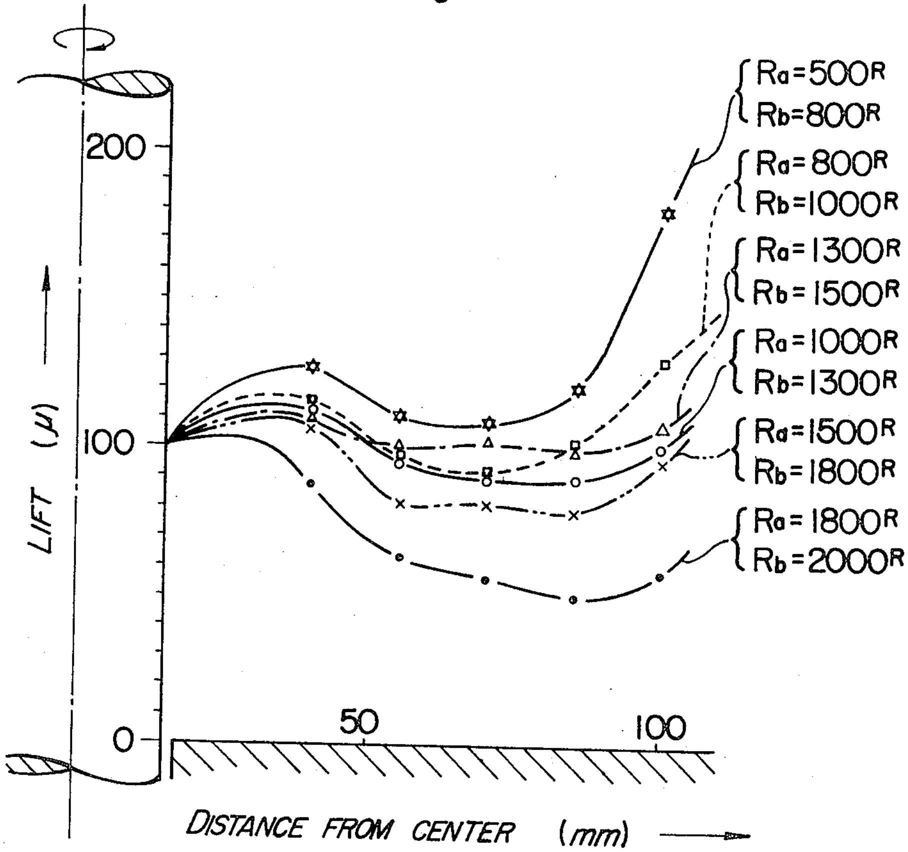
FIG. 8 is a diagram showing the relation between the lift of the flexible disk upon the ridge of the stabilizing plate and the radial position of the flexible disk along the ridge of the stabilizing plate measured for the upper surfaces with various dimensions shown in FIG. 7.

In order to attain the straight profile of the flexible disk as shown in FIG. 6, the cross sectional configuration of the stabilizing plate shown in FIG. 5 must be determined to satisfy certain conditions. FIG. 7 shows an explanatory view of the cross sectional configuration of the stabilizing plate shown in FIG. 5 having two symmetrical valley or concave portions. Ra denotes the radius of the upwardly curved or convex center portion; Rb, the radius of the valley or concave portion; $r_a$, the distance between the centers of the upwardly and downwardly curved or convex and concave portions; and $r$, the radius of the flexible disk. The inventors made extensive experiments by varying the above factors Ra, Rb, $r_a$ and $r$, and the resultant lift of the flexible disk along the ridge of the convex portion of the stabilizing plate is shown in FIG. 8. FIG. 8 shows that the optimum result is obtained when the flexible disk has a thickness between 80 and 100 $\mu$ and a Young's modulus of for example less then $3 \times 10^4$ kg/cm$^2$, the upwardly convex curve is an arc with a radius Ra of 1,300 mm, the downwardly convex curve at the valley is an arc with the radius Rb of 1,500 mm and the distance $r_a$ between the centers of the upwardly and downwardly convex portions is about 0.6 times the radius $r$ of the flexible disk, that is $r_a = 0.6 \times r$. With the stabilizing plate with the above configurations, the flexible disk profile is very effectively improved, but it is understood that the present invention is not limited to the above data. For example, Ra may be 600 – 1,500 mm; Rb 1300 – 2000 mm; and $r_a$, 0.5 – 0.7 $\times$ $r$. Furthermore, it has been observed that the relation between Ra, Rb, $r_a$ and $r$ as given above may be almost unchanged even when the flexible disk has a Young's modulus of more than $3 \times 10^4$ kg/cm$^2$.

Figure 9:
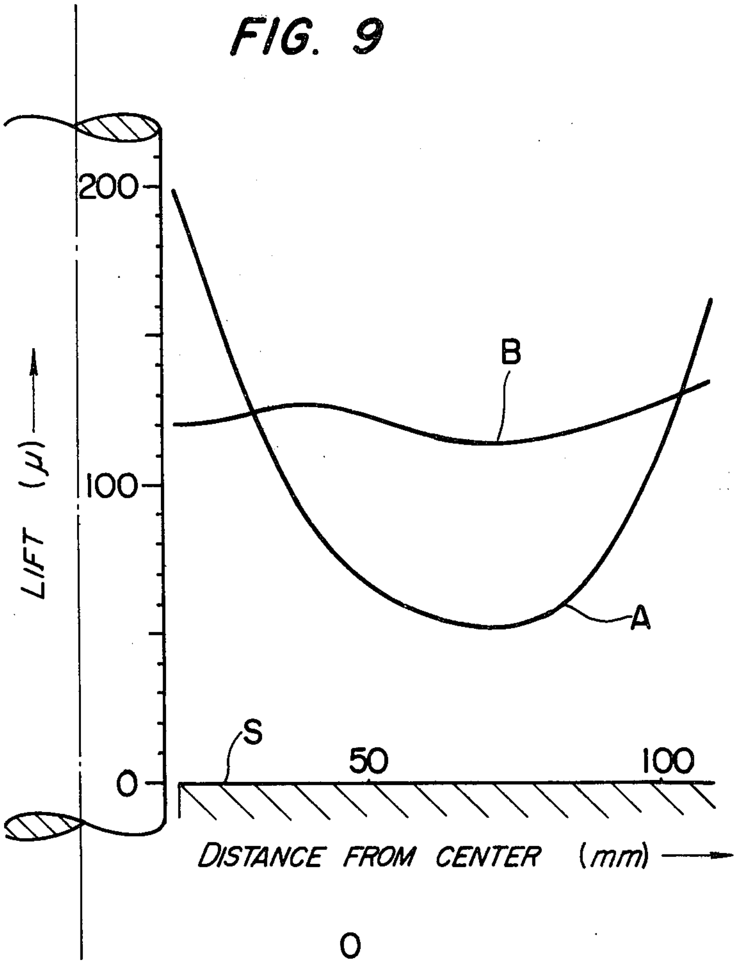
FIG. 9 is a diagram similar to FIG. 8 showing the difference between the prior stabilizing plate of FIG. 1 and the stabilizing plate according to the present invention.

FIG. 9 shows the lifts of the flexible disk upon the stabilizing plate shown in FIG. 1 and upon the optimum stabilizing plate in accordance with the present invention. The left from the center of the flexible disk in the radial direction is plotted along the abscissa and the lift along the ordinate. S denotes the surface of the stabilizing plate; and curves A and B, the undersurfaces of the fllexible disks. The curve A shows the lift of the flexible disk over the stabilizing plate shown in FIG. 1 of the type having a half cylindrical convex surface with a radius of 1000 mm which is considered to provide optimum stability in such type. The curve B indicates the lift of the flexible disk over the stabilizing plate in accordance with the present invention shown in FIG. 4 in which Ra is 1,300 mm; Rb, 1,500 mm; and $r_a$, 60 mm. The disk has a radius of 105 mm, a thickness of 100 $\mu$ and Young's modulus of $2.3 \times 10^4$ kg/cm$^2$. It will be understood from FIG. 9 that the linearity of the profile of the flexible disk has been much improved, and the profile curve is substantially parallel with the surface S of the stabilizing plate. Since the deformation of the curve of the flexible disk is minimized, vibration is also minimized.

Next referring to FIGS. 10(A) and 10(B), the cross sectional configuration of the stabilizing plate in accord with the present invention will be described in more detail. FIGS. 10(A) and 10(B) show the right half section of the stabilizing plate, and the axis is indicated by the line 0—0 and the radius of the flexible disk, by $r$, In FIG. 10(A) the height of the edge portion of the stabilizing plate in opposed relation with the edge of the flexible disk is higher than the ridge of the upwardly convex portion by δ whereas in FIG. 10(B) the edge portion is lower than the ridge by δ. In the case of the stabilizing plate of the type shown in FIG. 10(A) the edge of the flexible disk is bent downwardly in the profile shown in FIG. 6 because the edge of the stabilizing plate is raised upwardly so that the air at the edge portion is reduced in quantity. Therefore the flexible disk cannot be maintained in parallel with the surface of the stabilizing plate. Furthermore in the stabilizing plate of this type the edge portion of the flexible disk is raised higher than the center portion thereof in the profile shown in FIG. 5 so that the flexible disk is subjected to deformation. Therefore the vibration is increased, and the desired cross sectional configuration cannot be maintained. It is therefore preferable to have the edge portion of the stabilizing plate in opposed relation with the edge of the flexible disk made lower than or equal to the ridge portion. Then the smooth rotation of the flexible disk may be ensured and the ideal cross-sectional configuration may be obtained.

The stabilizing plates with the ideal cross sectional configuration in accordance with the present invention may be mass-produced by plastic forming or by pressing metallic plates. In case of the manufacture of the stabilizing plates by pressing sheet metal, the cross sectional configuration shown in FIG. 11 may improve productivity. As in the case of the stabilizing plate shown in FIG. 7, the stabilizing plate made of metallic sheet has symmetrical valley portions or concave portions, but it should be noted that only the ridge and bottom portions have the curved cross sectional configuration with the radius Ra and Rb, respectively, and that the curved ridge and bottom portions are connected by straight lines. The bottom portions are also connected with the edges by straight lines. Since only the ridge and bottom portions are curved, the metal forming process such as bending may be much facilitated and the dimensional accuracies may be much improved. Furthermore the preparation of molds for moulding, pressing and the like may be also facilitated.

FIGS. 12 and 13 show the stabilizing plate provided in a cartridge for housing a flexible disk. In general it is preferable to place a flexible disk into a cartridge in order to keep it free from dust and to facilitate handling. In other words the flexible disks are not handled directly. It has been already proposed to form a stabilizing surface upon one of the inner surfaces of the cartridge. However, when the stabilizing plate of the present invention is incorporated within the cartridge, further advantages may be obtained in addition to the features and advantages described hereinbefore. First of all, the thickness of the stabilizing plate of the present invention shown in FIG. 14(B) may be considerably reduced as compared with the conventional stabilizing plate shown in FIG. 14(A). This means that the overall thickness of the flexible disk cartridge may be also reduced. The advantage obtained by the reduction in thickness of the flexible disk cartridge is apparent and will be described in more detail hereinafter.

FIG. 12 shows the flexible disk cartridge of the present invention, and FIG. 13 is an exploded perspective view thereof. Reference numeral 7 denotes a lower casing of the cartridge whose inner surface is so formed as to provide a stabilizing surface in accordance with the present invention. A center hole 9 is formed at the center of the lower casing 7 and a driving member 8 is inserted into the center hole 9. The driving member 8 is made integral with the driving shaft of a motor 19. The driving member 8 is provided with a recess into which is fitted a projected portion of a clamp member 11, thereby securely holding the flexible disk 2 in position. The clamp member 11 is rotatably received in a recess formed at the center of an upper casing 10, and is normally biased downwardly under the force of a leaf spring 13. The leaf spring 13 supports a ball 25 thereon at its center and is placed in position by a stopper 20 in contact with the ball 25. The stopper 20 is fixed to the upper casing 10 which in turn is assembled with the lower casing 7. The lower casing 7 is provided with grooves 23 and 24 into which are fitted rollers 14 and 15 loaded with leaf springs 16 and 17, respectively, so that the cartridge may be placed in a predetermined position. One ends of the leaf springs 16 and 17 are securely fixed to a base 18. The upper casing 10 is provided with an elongated slot 22 through which a transducer or pickup 21 scans the flexible disk 2. The upper and lower cases 10 and 7 may be removably joined together. The stabilizing surface may be formed upon the inner surface of the upper casing. When both surfaces of a flexible disk are used for recording, the stabilizing surfaces may be formed on both inner surfaces of the upper and lower casings.

The features and advantages of the stabilizing plate in accordance with the present invention may be summarized as follows:

1. The flexible disk may be maintained straight and in parallel with the surface of the stabilizing plate along the scanning line, and the vibration may be minimized. Thus the distance between the transducer and the flexible disk may be maintained constant so that correct and reliable recording and reproducing may be ensured.

2. As compared with the conventional stabilizing plate with a half cylindrical surface, the minimum lift may be increased (See FIG. 9) so that dust or foreign matters in the space between the flexible disk and the stabilizing plate or surface will not cause contact between the flexible disk and the stabilizing plate or surface. Therefore the stabilizing plate or surface in accord with the present invention does not permit a situation from developing in which rotation of the flexible disk is prevented by contact between the flexible disk and the stabilizing plate or surface and by the static electricity produced therebetween. This was confirmed by the experiments.

3. The portion of the flexible disk passing the scanning path of the transducer may be maintained completely flat. In other words the cross sectional configuration of the disk may be maintained straight through the overall length from the center to the edge thereof. Therefore, the recording zone may be increased so that the recording capacity may be also increased.

4. Even when the cross sectional configuration of the stabilizing plate is somewhat different from that shown in FIG. 7 with Ra = 1300 mm, Rb = 1500 mm and $r_a = 0.6r$ and even when the material and thickness of a flexible disk are somewhat different, the lift characteristic remains almost unchanged. This means that the interchangeablity among the flexible disk recording and reproducing apparatus and flexible disks is ensured. This feature is particularly advantageous when several "soft-ware" companies are established in the future.

5. The stabilizing plates of the present invention may be mass-produced in a simple manner by plastic or metal forming. Especially the stabilizing plate of the type shown in FIG. 11 is adapted to be produced by bending with a higher degree of accuracy.

6. When the stabilizing surfaces are formed in the inner surfaces of the flexible disk cartridges, the thickness of the cartridge may be considerably reduced. Therefore the flexible disk cartridges may be made light in weight. The space for storing the flexible disk cartridges may be reduced. Mailing and transportion of flexible disk cartridges may be also facilitated. Furthermore cartridge autochanger-players may be made compact in size.

In addition to the above, the present invention has many other features and advantages.

What is claimed is:

1. In combination a recording and reproducing apparatus having a recording and reproducing head, disk-shaped flexible recording medium, means for rotating said recording medium a stabilizing plate supporting said recording medium, said stabilizing plate having a cross section convexly curved along its longitudinal center line to form a ridge at the uppermost portion thereof and reversely curved at either side of its center portion to form a valley between the center portion and each edge thereof, said edge being higher than the bottom of said valley, means forming a passageway between said recording medium and said plate said disk-shaped flexible recording medium being supported above said stabilizing plate by an air cushion produced by the flow of air between said recording medium and said stabilizing plate during rotation of said recording medium and means for translating said head along said ridge of said stabilizing plate.

2. A recording and reproducing apparatus as defined in claim 1 wherein the cross sectional configuration of said stabilizing plate has valley or concave portions formed by symmetrically about the ridge of said upwardly curved or convex center portion; and the radius of said upwardly curved or convex center portion of said stabilizing plate is about 1,300 mm, the radius of said valley portions is about 1,500 mm, and the horizontal distance between said ridge and the bottom of each of said valley portions is 0.6 times the radius of said flexible recording medium used.

3. A recording and reproducing apparatus as defined in claim 1 wherein the cross sectional configuration of said stabilizing plate is such that two valley or concave portions are formed symmetrical about the ridge of said upwardly curved or convex center portion; said convex center portion being connected to each of said valleys by a straight line.

4. A recording and reproducing apparatus as defined in claim 1 wherein the height of the portion of said stabilizing plate in opposed relation with the edge of said flexible recording medium is made equal to or lower than the height of the ridge of said upwardly curved or convex center portion.

5. A recording and reproducing apparatus as defined in claim 1 wherein said stabilizing plate is formed in at least one of the inner surfaces of a cartridge which are in opposed relation with said flexible recording medium housed within said cartridge.

6. A recording and reproducing apparatus as defined in claim 2 wherein the cross sectional configuration of said stabilizing plate is such that two valley or concave portions are formed symmetrical about the ridge of said upwardly curved or convex center portion; said convex center portion being connected to each of said valleys by a straight line.

7. A recording and reproducing apparatus as defined in claim 2 wherein the height of the portion of said stabilizing plate in opposed relation with the edge of said flexible recording medium is made equal to or lower than the height of the ridge of said upwardly curved or convex center portion.

8. A recording and reproducing apparatus as defined in claim 3 wherein the height of the portion of said stabilizing plate in opposed relation with the edge of said flexible recording medium is made equal to or lower than the height of the ridge of said upwardly curved or convex center portion.

9. A recording and reproducing apparatus as defined in claim 2 wherein said stabilizing plate is formed in at least one of the inner surfaces of a cartridge which are in opposed relation with said flexible recording medium housed within said cartridge.

10. A recording and reproducing apparatus as defined in claim 3 wherein said stabilizing plate is formed in at least one of the inner surfaces of a cartridge which are in opposed relation with said flexible recording medium housed within said cartridge.

11. A recording and reproducing apparatus as defined in claim 4 wherein said stabilizing plate is formed in at least one of the inner surfaces of a cartridge which are in opposed relation with said flexible recording medium housed within said cartridge.

* * * * *